Feb. 18, 1936.  H. LISIUS  2,030,994
CULTIVATOR
Filed Jan. 8, 1935
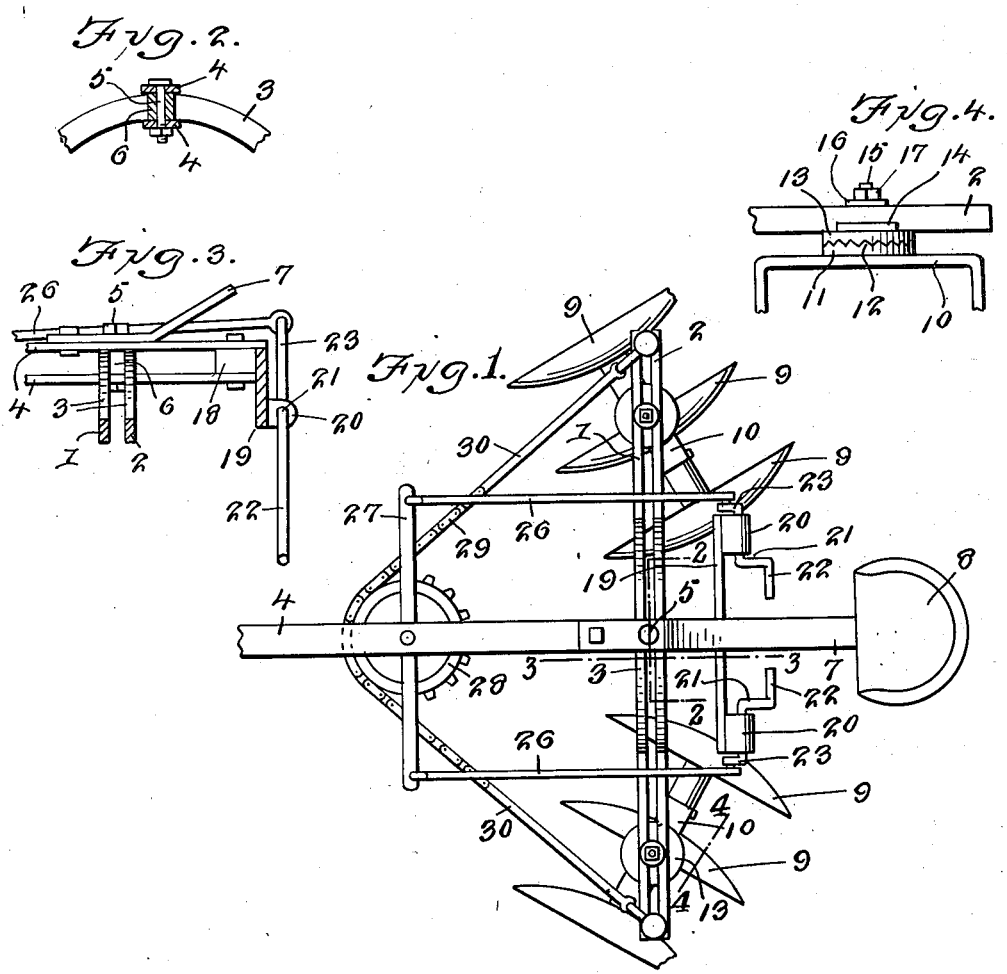
Henry Lisius
INVENTOR
BY Victor J. Evans & Co.
ATTORNEY Patented Feb. 18, 1936

2,030,994

UNITED STATES PATENT OFFICE 2,030,994

CULTIVATOR

Henry Lisius, Havelock, N. Dak.

Application January 8, 1935, Serial No. 880

4 Claims. (Cl. 97—54)

This invention relates to agricultural implements and especially to straddle-row disk cultivators, the object being to provide means whereby the gangs of disks may be kept in proper relation to the row of plants. In cultivating a crop, if one gang of disks should grip or dig in deeper than the other gang, the cultivator will swing toward the side of the more lightly gripping gang and the plants are very apt to be damaged. My invention provides means whereby this tendency to slue around may be overcome and the cultivator made to properly follow the row. The invention is illustrated in the accompanying drawing and will be hereinafter fully described, the novel features being particularly defined in the appended claims.

In the drawing:

Figure 1 is a plan view of a cultivator showing one embodiment of the invention.

Figure 2 is a detail section on the line 2—2 of Figure 1.

Figure 3 is a section on the line 3—3 of Figure 1.

Figure 4 is a detail elevation of the disk support, the view point being indicated by the line 4—4 in Figure 1.

Referring more particularly to Figure 1, there is shown a frame consisting of parallel transverse beams 1 and 2 having a central arched portion 3 whereby topping of the plants is avoided. A draw bar or tongue 4 consists of vertically spaced flat bars having their rear end portions disposed above and below the arch 3 and extending rearwardly beyond the same, a bolt 5 connecting said bars between the beams and a spacer 6 being fitted around the bolt to resist bending of the bars. Draft applied to the front end of the draw bar by a tractor or draft animals will thus be transmitted to the frame to draw the cultivator along the row of plants. A seat standard 7 is secured upon the draw bar and carries a seat 8, as shown, and the frame bars are, of course, bolted together, spacers being provided around the bolts to maintain the spaced relation of the bars.

The cultivator disks 9 are rotatably mounted upon an axle in the usual manner, the axle being secured in the lower end of a yoke 10 and spacers being fitted on the axle between the disks. In the forms of the invention shown, a boss or disk 11 is formed on the top of the yoke and has a series of notches or teeth on its upper side, as shown at 12, and a similar mating disk 13 is interposed between the frame and the disk 11. The disk 13 has ribs 14 on its upper side to engage the sides of the frame and thereby prevent relative turning of the disk, and a threaded stud 15 rises centrally from the disk 11 through a central opening in the disk 13 and through the space between the frame bars. A washer 16 and nut 17 mounted on the stud above the frame secures the yoke to the frame and the mating interengaging teeth on the disks hold the gang of cultivator disks in a set angular relation to the frame.

Secured rigidly to the rear ends of the draw bar members, and to a filler block 18 secured between them, is a cross bar or plate 19 at the ends of which are bearings 20, a rock shaft 21 being journaled in and extending through each bearing. Each shaft has a pendent crank or pedal 22 at its inner end and an upwardly extending crank 23 at its inner end, the pedals forming rests for the feet of the operator and easily reached from the seat 8. The frame may move pivotally upon the bolt 5 and a front steering bar 27 is pivoted to the draw bar between its ends. Connecting rods 26 are mounted at their rear ends upon the cranks 23 and have their front ends pivoted to the steering bar 27. Disposed between the members of the draw bar and fixed to the steering bar is a sprocket gear 28 about which is trained a sprocket chain 29 having its ends connected by links 30 with the respective ends of the frame bars 1 and 2. It will now be understood that the cultivator gangs are adjusted to a normal angular position, with the steering bar 27 at a right angle to the draw bar, before starting to travel along the row of plants. Then, if the right hand gang, for instance, should for any reason work ahead of the left hand gang it will tend to dig deeper into the ground and cause the machine to veer or swing to the left and approach so close to the plants as to cut into them. To remedy this condition, the operator pushes upon the right hand pedal 22 thereby rocking the corresponding shaft 21 and exerting a pull upon the attached rod 26 which will cause the steering bar 27 to rock. The frame bars 1, 2 will turn in unison with the bar 27 so that the left hand gang will be advanced and the right hand gang retarded, and the machine returned to even travel.

From the foregoing description, taken in connection with the accompanying drawing, it will be seen that I have provided a compact mechanism which may be easily manipulated and by which the implement may be caused to follow the row without causing any damage to the plants.

Having described my invention, what I claim is:

1. A cultivator comprising a frame, a draw bar pivoted to the frame, cultivator gangs carried by the ends of the frame, a gear mounted on the draw bar, a flexible connection between the gear and the ends of the frame, and means for rocking the gear to advance one gang relative to the other gang.

2. A cultivator comprising a frame, a draw bar pivoted to the frame, cultivator gangs adjustable on vertical axes on the frame, a gear on the draw bar, a flexible connection between the gear and the ends of the frame, and means for rocking the gear to advance one gang relatively to the other gang.

3. A cultivator comprising parallel transverse beams having arched central portions, a draw bar pivoted to the centers of said arched portions, cultivator gangs adjustably mounted on vertical axes on the ends of the beams, a gear mounted on the draw bar, a flexible connection between the gear and the ends of the beams, and means for rocking the gear to advance one gang relatively to the other gang.

4. A cultivator comprising a frame, a draw bar pivoted to the frame, axles, cultivator discs rotatably mounted on the axles, a yoke for each axle, bosses having interdigitating teeth carried respectively by the frame and each yoke, vertically disposed bolts for adjustably connecting the bosses to hold the discs in angular set positions, a gear mounted on the draw bar, a flexible connection between the gear and the ends of the frame, and means for rocking the gear to advance one of the axles relatively to the other axle.

HENRY LISIUS.